June 5, 1951  J. SICZKIEWICZ, JR  2,555,766
FILTER FOR COFFEE BREWERS
Filed Sept. 12, 1949
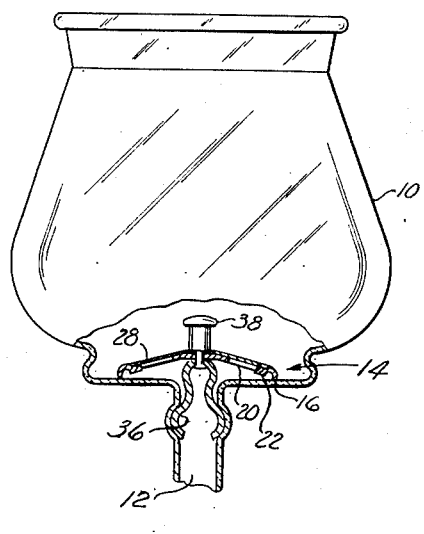
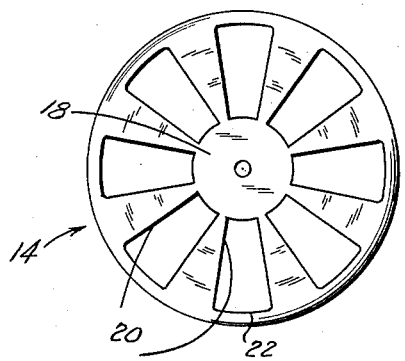
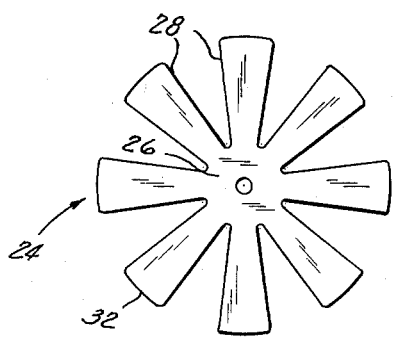
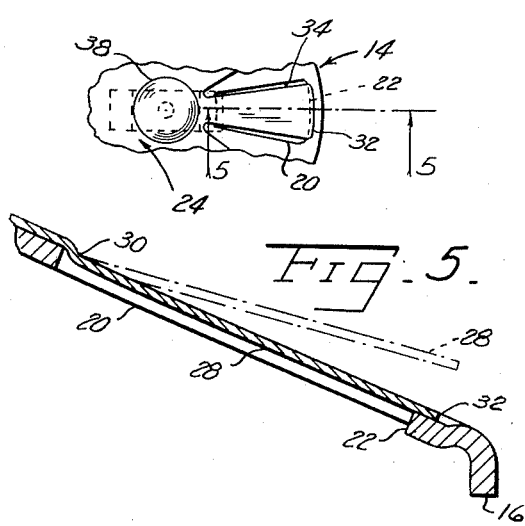
INVENTOR.
Joseph Siczkiewicz Jr.
BY John W. Michael
ATTORNEY Patented June 5, 1951

2,555,766

UNITED STATES PATENT OFFICE 2,555,766

FILTER FOR COFFEE BREWERS

Joseph Siczkiewicz, Jr., Milwaukee, Wis., assignor to Geuder, Paeschke & Frey Co., Milwaukee, Wis., a corporation of Wisconsin Application September 12, 1949, Serial No. 115,278

7 Claims. (Cl. 210—162)

This invention relates to improvements in filters, especially to the type used with vacuum-type coffee brewers.

In the brewing of good coffee in vacuum-type coffee brewers it is important to have the hot water surge upwardly into the upper bowl with as great a rate of volumetric flow as possible. This quick contact between the coffee and the volume of water has a decided effect on obtaining a desirable natural coffee flavor. It is also a safety factor in that explosions due to over increase of pressure in the lower bowl are avoided. Previously, strainers of glass have been loosely seated in the opening to the upper bowl with the expectation that they would raise upwardly against the force of gravity to let hot water enter such bowl as pressure was developed in the lower bowl. Because such strainers were either too heavy, or the pressure drop when they were raised just a little was too great, or for some reason, they did not raise enough to let the hot water surge into the upper bowl.

It is an object of this invention, therefore, to provide a filter which will open wide enough to let hot water enter the upper coffee bowl at a large enough volumetric flow to quickly fill such bowl to proper level and which will also prevent the coffee grounds from entering the lower bowl.

This object is obtained by making the filter somewhat like a check valve with radial flexible gates (or petals or arms) which normally seat on ports of the valve body to close such ports and which are readily pressed upwardly against their inherent resistance by the pressure of fluid passing upwardly through the ports. However, in this instance the gates are slightly narrower than the ports so that when seated on the ports there are provided a plurality of narrow slots therebetween down through which the brew can seep while the coffee grounds are held back. However, when the hot water moving upwardly strikes against such gates they will easily lift and widely open the ports to let the entire proper volume of water enter into the upper bowl in the quickest possible time.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Fig. 1 is a view partly in elevation and partly in section of a coffee brewer having a filter embodying the present invention;

Fig. 2 is a top plan view of the conical port providing an element of the filter;

Fig. 3 is a top plan view of the gate-supporting element of the filter;

Fig. 4 is a fragmentary top plan view of the assembled filter; and

Fig. 5 is an enlarged fragmentary section taken on line 5—5 of Fig. 4.

Referring to the drawings by reference numerals, the filter embodying the invention is shown positioned in the upper bowl 10 of a vacuum type of coffee brewer. With this type of brewer water from the lower bowl is forced upwardly through the opening 12 into the upper bowl where it comes in contact with the coffee placed therein. Thereafter the coffee brew is drawn downwardly through the opening 12 into the lower bowl. The function of the filter hereindescribed is to prevent coffee grounds from going down the opening 12 into the lower bowl and to readily permit water to enter the upper bowl in the least possible time. The filter consists of a main body 14 which is conical in shape and has a base 16 in the form of a cylindrical flange which rests upon the bottom of the upper bowl 10. The apex of the member 14 is flattened to provide a central portion 18 to which is secured the gate-supporting spider 24. The conical walls of the member 14 have a plurality of elongated ports 20 which extend radially from the central portion 18 and terminate in outer ends 22 which have the upper surfaces thereof depressed below the outer surface of said wall. While it is not essential that the openings 20 be narrower at their inner ends than at their outer ends, such relationship permits the openings to have a larger area without materially weakening the member 14.

The gate-supporting spider 24 is made of very thin resiliently flexible metal and has a flat central portion 26 from which a plurality of flexible arms or gates 28 extend radially downwardly. The gates are shaped in the form of a petal to substantially the shape of the ports 20. The gates 28 are narrower and longer than the ports 20 so that in the normal biased position thereof the outer ends 32 of the gates will rest lightly upon the depressed surface of the outer ends 22 of the ports. In this normal position the sides of the gates 28 and the ports 20 will be spaced to form a plurality of slots indicated generally at 34. The width of these slots is narrow enough to prevent coffee, either dry or in the form of wet coffee grounds, from passing downwardly therethrough and wide enough to permit the coffee brew to seep therethrough. It is preferable to provide a downward offset 30 (see Fig. 5) at the juncture point of the gates 28 with the portion 26 to depress the outer surface of such gates to substantially the same level as the outer surface of the member 14.

The filter is held in place within the upper bowl 10 by means of a spring clamp 36 which is secured to the underside of the central portion 18 by a riveted head on the handle 38. The handle 38 in cooperation with its riveted head also secures the central portion 26 of the spider 24 to the central portion 18 of the member 14.

Because the outer ends of the gates 28 are considerably wider than their neck portion about which the major flexing thereof takes place, it will require only a very slight pressure to spring the gates upwardly and widely open the ports 20. As water under pressure rises in the opening 12 and it hits against the gates 28 they will immediately be flexed upwardly and open the ports 20 wide enough (see dotted lines in Fig. 5) to permit such water to surge rapidly therethrough. The surging of the water carries with it the dry coffee in the upper bowl and thus prevents it from entering the opening 12 while the water is coming up therethrough. When the proper amount of water has entered the bowl 10, the upward movement thereof will stop and immediately the gates 28 will resume their normal position closing the ports 20 except for the slots 34. Thereafter as pressure within the lower bowl decreases below atmosphere, the coffee brew will be drawn down through the slots 34 into the lower bowl and the coffee grounds will be filtered from such brew as it seeps through the slots 34.

Although only one embodiment of the invention is shown and described herein, it will be understood that this application is intended to cover such changes or modifications as come within the spirit of the invention or scope of the following claims.

I claim:

1. A filter for a coffee brewer comprising a valve seat having a port therein, and a flexible petal inherently biased to seat down upon said port, the area of said petal in juxtaposition with said port being less than the area of said port so that in the seated position of said petal an opening exists which is large enough to let coffee brew seep therethrough and restrain coffee grounds from passing therethrough.

2. A filter for a coffee brewer comprising a valve seat having a port therein, and a flexible petal inherently biased to seat down upon said port, said petal being easily lifted from said port by the pressure of fluid passing upwardly therethrough, the area of said petal in juxtaposition with said port being less than the area of said port so that in the seated position of said petal an opening exists which is large enough to let coffee brew seep therethrough and restrain coffee grounds from passing therethrough.

3. A filter for a coffee brewer comprising a first member with a wall having a plurality of ports adapted to freely permit the flow of liquid therethrough, and a second member mounted on said first member and having a plurality of flexible arms normally seated on said ports, the area of said arms in juxtaposition with said ports being less than the area of said ports so that in the seated position of said arms an opening exists which is large enough to let coffee brew seep therethrough and restrain coffee grounds from passing therethrough.

4. A filter for a coffee brewer comprising a member having a port for the free flow of liquid therethrough, and a thin flexible gate resting on said member over said port to restrict flow in one direction and swingable away from said member to unrestrict flow in the opposite direction, that portion of said gate overlying said port being smaller than said port so that in the seated position of said gate a slot is formed large enough to let coffee brew seep therethrough and restrain coffee grounds from passing therethrough.

5. A filter for the upper bowl of a coffee brewer for freely permitting water to enter said upper bowl and for restraining the passage of coffee grounds from said bowl comprising, a first member mounted in the opening to said upper bowl and having a plurality of elongated ports extending radially of the central portion thereof, a second member mounted on the top of the central portion of said first member and having a plurality of elongated flexible gates extending radially of the central portion of said second member, said gates having outer ends resting on the outer ends of said ports in said normal position, and the sides of said gates being spaced inwardly of the sides of said ports to provide slots therebetween wide enough in the closed position of said gates to let coffee brew seep therethrough and restrain coffee grounds from passing therethrough.

6. A filter for the upper bowl of a coffee brewer comprising a conical shaped member having a base adapted to support said filter in said bowl, said member having a plurality of elongated ports in the conical wall thereof to permit the flow of liquid therethrough, a second member having a central portion supported on the top of said conical shaped member, said second member having flexible gates super-imposed over said elongated ports and normally biased toward said ports, said gates being longer and narrower than said ports whereby the ends of said gates overlap and normally rest on the ends of said ports while the sides of said gates are spaced from the sides of said ports to provide slots for the downward seepage of brew from said bowl, and means for holding the filter in place in said bowl.

7. A filter as claimed in claim 6 in which said ports have outer ends depressed below the surface of said conical wall and the ends of said gates rest in said depressed outer ends.

JOSEPH SICZKIEWICZ, Jr.

REFERENCES CITED

The following references are of record in the file of this patent:

UNITED STATES PATENTS

| Number | Name | Date |
|---|---|---|
| 670,794 | Lott | Mar. 26, 1901 |
| 1,615,071 | Cobb | Jan. 18, 1927 |
| 2,269,956 | Renner | Jan. 13, 1942 |
| 2,452,881 | Vezie | Nov. 2, 1948 |
| 2,454,205 | Reichold | Nov. 16, 1948 |
| 2,461,736 | Hooper | Feb. 15, 1949 |
| 2,472,955 | Myers | June 14, 1949 |
| 2,482,940 | Ruhnke et al. | Sept. 27, 1949 |